United States Patent
Pirozzi et al.

(10) Patent No.: US 10,615,695 B1
(45) Date of Patent: Apr. 7, 2020

(54) HIGH VOLTAGE GENERATION FOR ESAD MUNITION FUZING CIRCUITRY

(71) Applicant: U.S. Government as Represented by the Secretary of the Army, Picatinny Arsenal, Dover, NJ (US)

(72) Inventors: John Pirozzi, Holmdel, NJ (US); Lloyd Khuc, Wharton, NJ (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 0 days.

(21) Appl. No.: 16/204,064

(22) Filed: Nov. 29, 2018

Related U.S. Application Data

(60) Provisional application No. 62/598,166, filed on Dec. 13, 2017.

(51) Int. Cl.
*F42C 17/04* (2006.01)
*H02M 3/158* (2006.01)
(Continued)

(52) U.S. Cl.
CPC .......... *H02M 3/1582* (2013.01); *F42B 3/18* (2013.01); *F42C 11/04* (2013.01); *F42C 15/40* (2013.01); *F42C 17/04* (2013.01)

(58) Field of Classification Search
CPC .. F42Q 7/24; F42C 15/40; F42C 15/42; F42C 17/04; F42C 19/12; F42C 19/14; H02M 3/1582; F42B 3/18
(Continued)

(56) References Cited

U.S. PATENT DOCUMENTS

| 4,204,475 A | * | 5/1980 | Fowler | F42C 15/40 102/221 |
| 6,675,715 B1 | * | 1/2004 | Kolbli | F42C 11/008 102/206 |

(Continued)

FOREIGN PATENT DOCUMENTS

DE      3543938 C1 * 7/1987 .............. F42C 15/40

OTHER PUBLICATIONS

Zainal et al., High Voltage Boost Converter for Capacitor Charging Power Supply, Jabatan Fizik Universiti Teknologi Malaysia, 2008, 68-73, vol. 3, Universiti Teknologi Malaysia, Malaysia.
(Continued)

*Primary Examiner* — Stephen Johnson
(74) *Attorney, Agent, or Firm* — John P. DiScala

(57) ABSTRACT

An improved system and method for generating high Voltage within an ESAD munition fuze is provided. Conventionally, high voltage transformer conversion circuits used within ESAD munition fuzes utilize a flyback, or step-up transformer. The use of a flyback, or step-up transformer reveal technical limitations when used for the application of increasing arm charge times, voltage conversion efficiency, and power conversion efficiency for ESAD munition fuze applications. Alternatively, the use of a high voltage inductor conversion circuit utilizing an inductor, in combination with a switching transistor allows for a new and improved low cost method for improving ESAD munition fuze applications with respect to generating high voltage from a low voltage source onto a detonator firing capacitor to trigger a Low Energy Explosive Foil Initiator (LEEFI) within an ESAD munition fuze.

12 Claims, 2 Drawing Sheets

Figure 1:
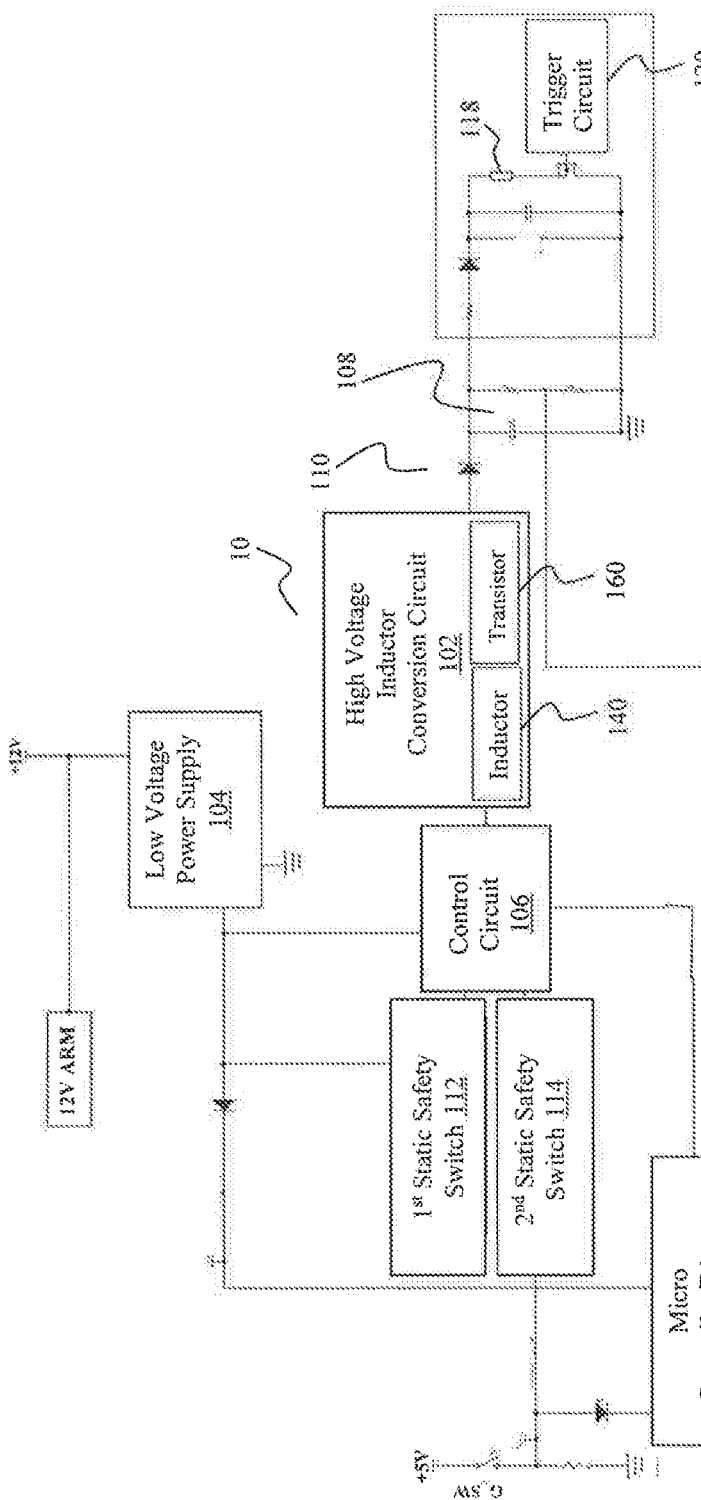

(51) Int. Cl.
  *F42B 3/18* (2006.01)
  *F42C 11/04* (2006.01)
  *F42C 15/40* (2006.01)
(58) Field of Classification Search
  USPC .................................................. 102/262, 272
  See application file for complete search history.

(56) References Cited

U.S. PATENT DOCUMENTS

| | | | |
|---|---|---|---|
| 7,240,617 B1* | 7/2007 | Bonbrake | ............... F42C 15/40 102/215 |
| 7,243,027 B2 | 7/2007 | Ribeiro et al. | |
| 8,151,707 B1 | 4/2012 | Lasut | |
| 8,723,493 B2 | 5/2014 | Ring | |

OTHER PUBLICATIONS

Zdanowski et al., Highly Efficient and Compact 6 kW/4 x 125 kHz Interleaved DC-DC Boost Converter with SiC Devices and Low-Capacitive Inductors, Energies 2017, Mar. 14, 2017, 1-15, Multi-disciplinary Digital Publishing Institute, Basel, Switzerland.
Hauke, Basic Calculation of a Boost Converter's Power Stage, Application Report, Jan. 2014, Texas Instruments Incorporated, Dallas, TX.

* cited by examiner

HIGH VOLTAGE GENERATION FOR ESAD MUNITION FUZING CIRCUITRY

CROSS-REFERENCE TO RELATED APPLICATIONS

This application claims the benefit under 35 USC § 119(e) of U.S. provisional patent application 62/598,166 filed on Dec. 13, 2017.

STATEMENT OF GOVERNMENT INTEREST

The inventions described herein may be manufactured, used and licensed by or for the United States Government.

BACKGROUND OF THE INVENTION

The invention relates in general to Electronic Safe and Arm Device (ESAD) munition fuzing circuitry and in particular to an improved ESAD and process of generating high voltage for detonating Low Energy Explosive Foil Initiators (LEEFI) within ESADs.

A munition fuze, comprising an ESAD, triggers a LEEFI that detonates explosive material within the munition under specific conditions, ESAD munition fuzes typically receive a low voltage input, and convert the low voltage to a high voltage output through the use of a high voltage transformer conversion circuit. The high voltage generated by the high voltage transformer conversion circuit is then stored on a detonator firing capacitor to trigger a LEEFI. Prior ESAD munition fuzes utilize a flyback or step-up transformer to increase a low voltage input in the range of 8V to 12V to a high voltage output exceeding 960V.

There are several disadvantages to using the high voltage transformer conversion circuit based on evolving requirements for current ESAD munition fuze requirements. Limitations with respect to slower arm charge times greater than or equal to five seconds, higher low voltage efficiency levels greater than 5V to generate high voltage outputs greater than or equal to 960V, and lower power conversion efficiency due to primarily i^2*R "heat" and magnetic flux losses within the flyback or step-up transformer. These limitations have made the use of the high voltage transformer conversion circuit technically inadequate when used in current ESAD munition fuzes that require more efficient methods for increasing arm charge times, voltage conversion efficiency, and power conversion efficiency so that the Warfighter is presented with a reliable fuze.

In addition, the flyback or step-up transformers used within the high voltage transformer conversion circuit required to convert the low voltage input 8V to 12V to greater than 960V adds significant cost to the ESAD munition fuze design. Both flyback, and step-up transformers are typically manufactured by single sources thereby decreasing the availability of alternative suppliers.

Accordingly, a need exists for a high voltage conversion circuit to be implemented into ESAD munition fuze that will improve the process of generating high voltage greater than or equal to 960V from a low voltage input 2.6V to 5V within an ESAD. By the implementation of a high voltage inductor conversion circuit into an ESAD the reliability, functionality, and performance to generate high voltage for detonating a LEEFI within fuze munition applications will be enhanced.

SUMMARY OF INVENTION

One aspect of the invention, a high voltage inductor conversion circuit integrated into an ESAD. The high voltage inductor conversion circuit is used for the application of storing energy onto a detonator firing capacitor, and triggering a LEEFI within an ESAD munition fuze. The method includes the steps of: utilizing a high voltage inductor conversion circuit comprising an inductor, a switching transistor and a diode; providing a low voltage input 2.6V to 5V to drive a inductor; switching the switching transistor based on an switching algorithm technique at an operating frequency in the range of approximately 600 Hz to 1400 Hz and a duty cycle greater than or equal to approximately 99.5 percent according to generate a high voltage greater than or equal to 960V. When the switching transistor is in an on mode, energy is stored in the inductor; when the switching transistor is in an off mode, energy is transferred from the inductor to the detonator firing capacitor; a diode restricts the transfer of energy from the detonator firing capacitor to the inductor; providing an energy greater than or equal to 46 mJ to trigger a LEEFI within the ESAD munition fuze. The above frequency, duty cycle, and procedural steps for generating high voltage greater than or equal to 960V is fixed within the high voltage inductor conversion circuit.

Another aspect of the invention, a method for increasing arm charge times, voltage conversion efficiency, and power conversion efficiency within an ESAD by the use of a high voltage inductor conversion circuit, Arm charge times less than or equal to one second, voltage conversion efficiency 2.6V to 5V to a high voltage greater than 960V, and power conversion efficiency greater than or equal to 80 percent for storing the required energy equal to or greater than 46 mJ onto a detonator firing capacitor to trigger a LEEFI, and detonate the explosive material within the munition. The method includes the steps of: utilizing an ESAD munition fuze comprising a low voltage power supply, providing power to a control circuit; switching on a first and second static safety switches; generating a dynamic arm signal; operating the high voltage inductor conversion circuit at an operating frequency in the range of approximately 600 hertz to 1400 hertz and a duty cycle greater than or equal to approximately 99.5 percent to generate greater than 960V; transfer energy stored in the inductor to the detonator firing capacitor; storing an energy equal to or greater than 46 mJ on the detonator firing capacitor, discharging the stored energy greater than 46 mJ on the detonator firing capacitor to trigger a LEEFI; detonating the explosive material within the munition.

The invention will be better understood, and further objects, features and advantages of the invention will become more apparent from the following description, taken in conjunction with the accompanying drawings.

BRIEF DESCRIPTION OF IRE DRAWINGS

In the drawings, which are not necessarily to scale, like or corresponding parts are denoted by like or corresponding reference numerals, FIG. 1 is a block diagram of an ESAD munition fuze circuit incorporating a high voltage inductor conversion circuit, according to one illustrative embodiment.

Figure 2:
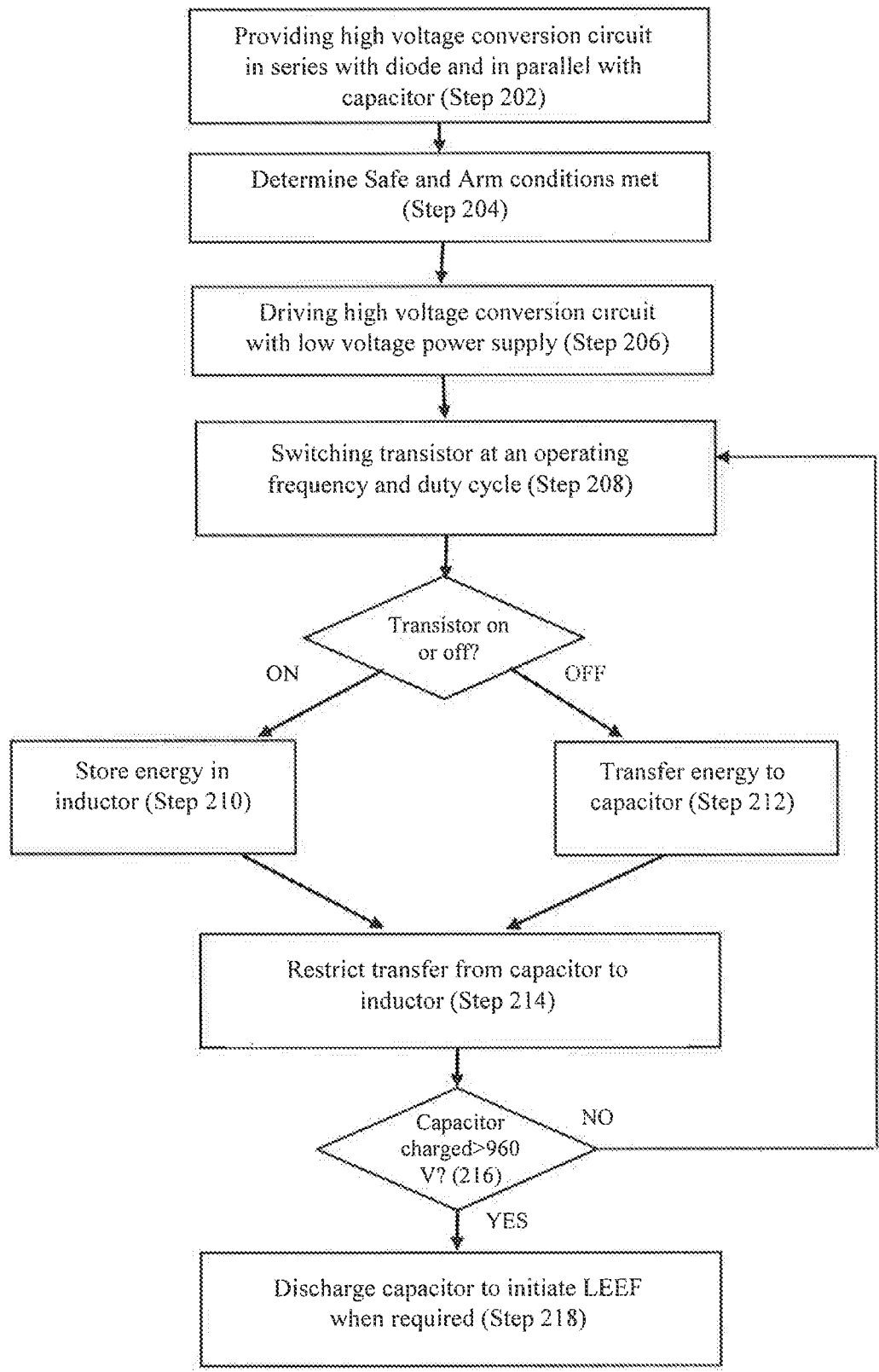

FIG. 2 is a flowchart illustrating the process of the ESAD munition fuze utilizing the high voltage inductor conversion circuit, according to one illustrative embodiment.

DETAILED DESCRIPTION

The invention relates to an improved method for generating a high voltage greater than 960V onto a detonator firing capacitor, that triggers a LEEFI for ESAD fuze munition applications. The high voltage inductor conversion circuit facilitates improved performance of ESAD munition fuzes by increasing arm charge times less than or equal to one second, voltage conversion efficiency 2.6V to 5V to a high voltage greater than 960V, and power conversion efficiency greater than 80 percent for storing the required energy equal to or greater than 46 mJ onto a detonator firing capacitor to trigger a LEEFI, and detonate the explosive material within the munition.

For the use of the high voltage transformer conversion circuit, ESAD munition fuzes require use of a sizable power source "battery" to power on, and arm the ESAD circuitry. Additional power must be harvested to trigger a LEEFI, and detonate the explosive material within the fuze. Given, due to the gun launched nature of a compact munitions, only a finite power source is achievable within the compact munitions. This is due to size restrictions of the compact munition available volume when referenced to the power source used in the compact munition. Given, in gun launched applications, there is limited amount of space available for power conversion components.

Advantageously, the high voltage inductor conversion circuit has an increased power conversion efficiency, and is capable of utilizing a low voltage source 2.6V to 5V to generate a high voltage output greater than 960V. Given the process of converting a low voltage 2.6V to 5V to a high voltage greater than 960V can be easily achieved with an increased power conversion efficiency, thus reducing the size of the power source. The high voltage transformer conversion circuit used in traditional ESAD fuze munition applications are not rated for a low voltage source 2.6V to 5V, but instead are rated for 8V to 12V, and are not able to generate high voltage greater than 960V required when driven from a low voltage 2.6V to 5V. Accordingly, the ESAD circuit described herein can utilize a compact battery thereby saving invaluable volume, and weight.

The high voltage inductor conversion circuit provides an improved arm charge tune when compared to the high voltage transformer conversion circuit used in ESAD munition fuze applications. The ESAD munition fuze described below generates, and stores high voltage greater than 960V onto the detonator firing capacitor within the arm charge time requirement less than or equal to one second.

The high voltage inductor conversion circuit has been optimized to store energy on a capacitive load, during its charging phase. This form of operation without a resistive load to absorb energy during each cycle of the charging phase is specific, and unique to the application of storing the energy greater than or equal to 46 mJ onto a detonator firing capacitor, to trigger a LEEFI, and to detonate the explosive material within ESAD munition fuzes.

Finally, the high voltage transformer conversion circuit based ESAD munition fuzes must guard against overcharging the detonator firing capacitor by including a feedback loop to monitor the status of the detonator firing capacitor. In the high voltage inductor conversion circuit based ESAD munition fuze described below, this is not necessary. By eliminating the need for the feedback signal, the ESAD munition fuze reduces the risk of malfunction, and reduces the overall size for compact munition referenced in [0015].

FIG. 1 is a block diagram of an ESAD munition fuze circuit incorporating a high voltage inductor conversion circuit, in accordance with one illustrative embodiment. The ESAD munition fuze circuit 10 arms and initiates a munition. For example, the ESAD munition fuze circuit 10 may arm and initiate an artillery munition, mine munition, a mortar munition, a 40 mm grenade munition or any other munition with a fuze which requires high voltage greater than 960V to operate.

The ESAD munition fuze comprises a low voltage power supply 104, a first static safety switch 112, a second static safety switch 114, a dynamic arm signal generator 116, a control circuit 106, a high voltage inductor conversion circuit 102, a diode 110, a detonator firing capacitor 108 and a fireset further comprising a LEEFI 118 and a trigger circuit 120.

The high voltage inductor conversion circuit 102 receives low voltage, for example 2.6V to 5V, from a low voltage power supply 104. The low voltage power supply 104 provides power to the control circuit 106. To convert the low voltage input 2.6V to 5V to a high voltage output greater than 960V, a first static safety switch 112, and a second static safety switch 114, have to be active on. The dynamic arm signal generator 116 must generate a set frequency/duty cycle to activate a dynamic arm logic. Both static safety switches 112 & 114, and the dynamic arm logic are comprised within the control circuit 106. Upon the above conditions being met the high voltage inductor conversion circuit 102 converts a low voltage 2.6V to 5V to a high voltage greater than 960V. In embodiments, the low voltage power supply 104 supplies low voltage within the range of approximately 2.6 V to 5 V. The high voltage converted by the high voltage inductor conversion circuit 102 is then stored on the detonator firing capacitor 108 to trigger the LEEFI 118. In embodiments, the voltage stored on the detonator firing capacitor 108 exceeds 960V. When the munition interacts with a target, trigger circuit 120 activates on and afterwards detonates the explosive material within the munition.

The high voltage inductor conversion circuit 102 includes an inductor 140 for storing energy and a switching transistor 160 for allowing the transfer of stored energy in the inductor 140 to a detonator firing capacitor 108. A diode 110 restricts the transfer of energy from the detonator firing capacitor 108 to the inductor 140. The high voltage inductor conversion circuit 102 is connected in series with the diode 110 and in parallel with the detonator firing capacitor 108. The switching transistor 160, in turn, is connected in series with the inductor 140.

Critically, in one embodiment, the inductor 140 is an approximately 5 mH to 15 mH inductor having a Q greater than two. The inductor 140 when driven inside the high voltage inductor conversion circuit 102 pulls approximately 60 milliamperes (mA) to 500 milliamperes (mA).

The switching transistor 160 is Metal-Oxide Field Effect Transistor (MOSFET) chosen for voltage threshold, and switching transition period. In one embodiment, the transistor has a drain-source voltage in the range approximately 1200 volts to approximately 1500 volts and a drain current in the range of approximately two amperes to approximately three amperes.

The switching transistor 160 is switched from an on mode to an off mode by a control circuit 106 at a relatively high frequency and with a relatively high duty cycle. In embodiments, the frequency is in the range of approximately 600 Hz to 1400 Hz. In embodiments, the duty cycle of the switching transistor 160 is approximately equal to or greater than 99.5 percent.

The frequency, and duty cycle of the high voltage inductor conversion circuit 102 is predetermined according to an switching algorithm technique based on the desired high voltage output greater than 960V and desired arm charge time equal to or less than one second. The control circuit 106 operates according to the following equation:

$$V\text{out}=|H(jw)|*(V\text{in}-Vr/(1-D))$$

Where Vout is the desired output voltage, H(jw) is the transfer function of the high voltage inductor conversion circuit 102, Vin is the input voltage, Vr is voltage loss within the system. The high voltage inductor conversion circuit 102 transfer function H(jw) ranges from 0 to 1 and is predetermined based on the components that comprise the high voltage inductor conversion circuit 102, transistor, and inductor, as well as the diode 110, and Capacitor 108. The input voltage is referenced, and driven by the low voltage power supply 104.

For the munition fuze to be operable, and therefore for the control circuit 106 to begin switching the high voltage inductor conversion circuit 102, the control circuit 106 must first determine that the first static safety switch 112, and the second static safety switch 114, are closed and that the dynamic arm signal is received to activate on the dynamic arm logic.

When the transistor is in the on Mode, the inductor 140 stores energy received from the low voltage power supply 104. When the transistor is in the off mode, the energy stored in the inductor 140 is transferred to the detonator firing capacitor 108. The sequence is repeated until the detonator firing capacitor 108 is charged to the desired amount necessary to trigger the LEEFI 118.

A diode 110 placed between the inductor 140 and the detonator firing capacitor 108 blocks the transfer of energy from the detonator firing capacitor 108 back to the inductor 140, In an embodiment, the diode 110 is a silicon carbide Schottky diode. In this embodiment, the diode 110 has a minimum direct current blocking voltage of approximately 1200 volts and a continuous forward current in the range of approximately one amperes to approximately 20 amperes.

FIG. 2 is a flowchart illustrating the process for generating a high voltage greater than 960V on a detonator firing capacitor 108, according to one illustrative embodiment. At Step 202, a high voltage inductor conversion circuit 102 in series with a diode 110 and in parallel with a detonator firing capacitor 108 are provided. The high voltage inductor conversion circuit 102 further comprises a switching transistor 160 and inductor 140.

At Step 204, the control circuit 106 determines that the safe and arm conditions are met. Specifically, the control circuit 106 determines that first static safety switch 112, and the second static safety switch 114, are switched on and that the dynamic arm signal is received by the dynamic arm logic.

At Step 206, the high voltage inductor conversion circuit 102 is driven by a low voltage power 104, In FIG. 1 the low voltage power supply 104 is in the range of approximately 2.6V to 5V.

At Step 208, the switching transistor 160 is switched at an operating frequency in the range of approximately 600 Hz to 1400 Hz and a duty cycle greater than or equal to approximately 99.5 percent according to the desired high voltage output greater than 960V.

At Step 210, when the switching transistor 160 is in an on mode, energy is stored in the inductor 140.

At Step 212, when the switching transistor 160 is in an off mode, energy is transferred from the inductor 140 to the detonator firing capacitor 108.

At Step 214, the transfer of energy from the detonator firing capacitor 108 to the inductor 140 is restricted by the diode 110.

At Step 216, the detonator firing capacitor 108 is charged to greater than 960V

At Step 218, in response to a triggering event at the trigger circuit 120, the detonator firing capacitor 108 is discharged and energy is transferred to the LEEFI 118 to initiate the munition.

The high voltage inductor conversion circuit 102 was successfully tested with three operating parameters. In each of these three tests, the frequency of the switching transistor was in the range of approximately 600 Hz to 1400 Hz and the duty cycle was equal to or greater than 99.5 percent. In the first test, the detonator firing capacitor 108 tested was a Model 3640 Pulsed Power Cap having a capacitance of 0.12 uF and a rated voltage of 1000V. The input voltage and input current from the low voltage power supply 104 was 2.6V and 60 mA, respectively. The high voltage inductor conversion circuit 102 successfully charged the detonator firing capacitor to 1000V in approximately 550 milliseconds.

In the second test of the high voltage inductor conversion circuit 102, the test employed a detonator firing capacitor 108 having capacitance of 0.1 uF and rated voltage of 1000V. The input voltage and input current from the low voltage power supply 104 was 2.6V and 60 mA, respectively. The high voltage inductor conversion circuit 102 successfully charged the detonator firing capacitor to 1000V in approximately 180 milliseconds.

In the third test of the high voltage inductor conversion circuit 102, the test employed a detonator firing capacitor 108 having a capacitance of 0.2 uF and a rated voltage of 1000V. The input voltage and input current from the low voltage power supply 104 was 2.6V and 60 mA, respectively. The high voltage inductor conversion circuit 102 successfully charged the detonator firing capacitor 108 to 1000V in approximately 350 milliseconds.

While the invention has been described with reference to certain embodiments; numerous changes, alterations and modifications to the described embodiments are possible without departing from the spirit and scope of the invention as defined in the appended claims, and equivalents thereof.

What is claimed is:

1. An electronic safe and arm device munition fuze for a munition comprising:
   a low voltage power supply in the range of approximately 2.6 volts to approximately 5 volts;
   a control circuit connected to the low voltage power supply;
   a first static safety switch in communication with the control circuit;
   a second static safety switch in communication with the control circuit;
   a dynamic arm signal generator for generating a dynamic arm signal and in communication with the control circuit wherein the control circuit drives a high voltage inductor conversion circuit at an operating frequency and a duty cycle when a desired condition of the first static safety switch and the second static safety switch is satisfied and a requited dynamic arm signal is received at the control circuit;
   the high voltage inductor conversion circuit which receives a low voltage power input from the low voltage power supply and generates a high voltage greater than approximately 960 volts on a detonator firing capacitor and further comprising an inductor for storing energy supplied by the low voltage power source, and a switching transistor operating at an operating frequency in the range of approximately 600 hertz to 1400 hertz and a duty cycle greater than or equal to approximately 99.5 percent, wherein the operating frequency and the duty cycle are determined according to a desired voltage output and wherein when the switching transistor is in an on mode of operation, energy is stored in the inductor and when the switching transistor is in an off mode of operation, the energy is transferred from the inductor to the detonator firing capacitor;

the detonator firing capacitor for storing energy equal to or greater than approximately 46 millijoules at a high voltage greater than approximately 960 volts;

a diode for restricting the transfer of energy from the detonator firing capacitor to the high voltage inductor conversion circuit; and a trigger circuit for receiving energy from the detonator firing capacitor and triggering a low energy explosive foil initiator that initiates an explosive material in the munition.

2. The electronic safe and arm device munition fuze of claim 1 wherein the inductor comprises a quality factor greater than or equal to approximately two.

3. The electronic safe and arm device munition fuze of claim 1 wherein the switching transistor has a drain-source voltage in the range approximately 1200V to approximately 1500V.

4. The electronic safe and arm device munition fuze of claim 3 wherein the switching transistor is a silicon carbide transistor.

5. The electronic safe and arm device munition fuze of claim 1 wherein the detonator firing capacitor has a capacitance of approximately 0.1 microfarads or greater.

6. The electronic safe and arm device munition fuze of claim 1 wherein the high voltage inductor conversion circuit generates a high voltage greater than or equal to 960 volts in less than or equal to approximately one second.

7. A method for generating high voltage onto a detonator firing capacitor to trigger a low energy explosive foil initiator within an electronic safe and arm device munition fuze, the method comprising the steps of:

providing a low voltage power source in the range of approximately 2.6 volts to approximately 5 volts to a control circuit to drive a high voltage inductor conversion circuit, the high voltage inductor conversion circuit comprising an inductor for storing energy supplied by the low voltage power source and a switching transistor;

determining that a desired condition of a static safety switch is satisfied;

determining that a required dynamic arm signal is received;

switching the switching transistor at a an operating frequency in the range of approximately 600 hertz to 1400 hertz and at a duty cycle greater than or equal to approximately 99.5 percent according to a desired voltage output;

when the switching transistor is in an on mode, storing energy in the inductor;

when the switching transistor is in an off mode, transferring energy from the inductor to the detonator firing capacitor;

restricting the transfer of energy from the detonator firing capacitor to the inductor by a diode; and generating and storing energy equal to or greater than approximately 46 millijoules at a high voltage greater than approximately 960 volts on the detonator firing capacitor.

8. The method of claim 7 further comprising the step of discharging the energy stored on the detonator firing capacitor to a low energy explosive foil initiator in response to a triggering event.

9. The method of claim 8 wherein the detonator firing capacitor triggers the low energy explosive foil initiator with a voltage in the range of approximately 960 volts to approximately 1500 volts.

10. The method of claim 7 wherein the inductor comprises a quality factor greater than or equal to approximately two.

11. The method of claim 7 wherein the transistor has a drain-source voltage in the range approximately 1200 volts to approximately 1500 volts.

12. The method of claim 7 wherein the step of generating and storing energy equal to or greater than approximately 46 millijoules at a high voltage greater than approximately 960 volts on the detonator firing capacitor further comprising the generating the energy in less than or equal to approximately one second.

* * * * *